No. 780,406. PATENTED JAN. 17, 1905.
F. W. BREHM.
PANORAMIC CAMERA.
APPLICATION FILED OCT. 17, 1904.
6 SHEETS—SHEET 2.
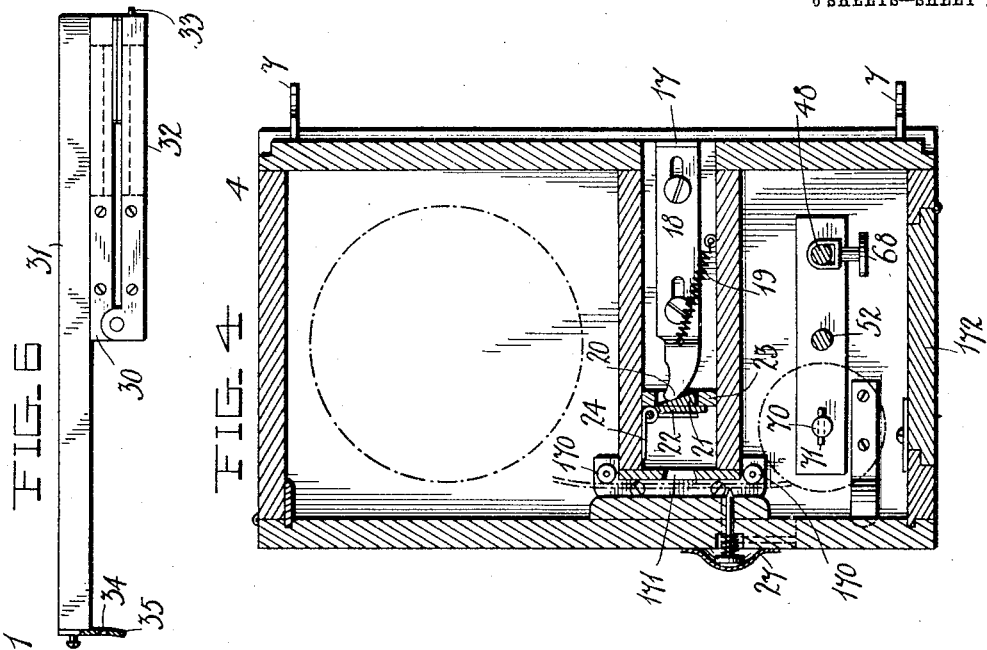
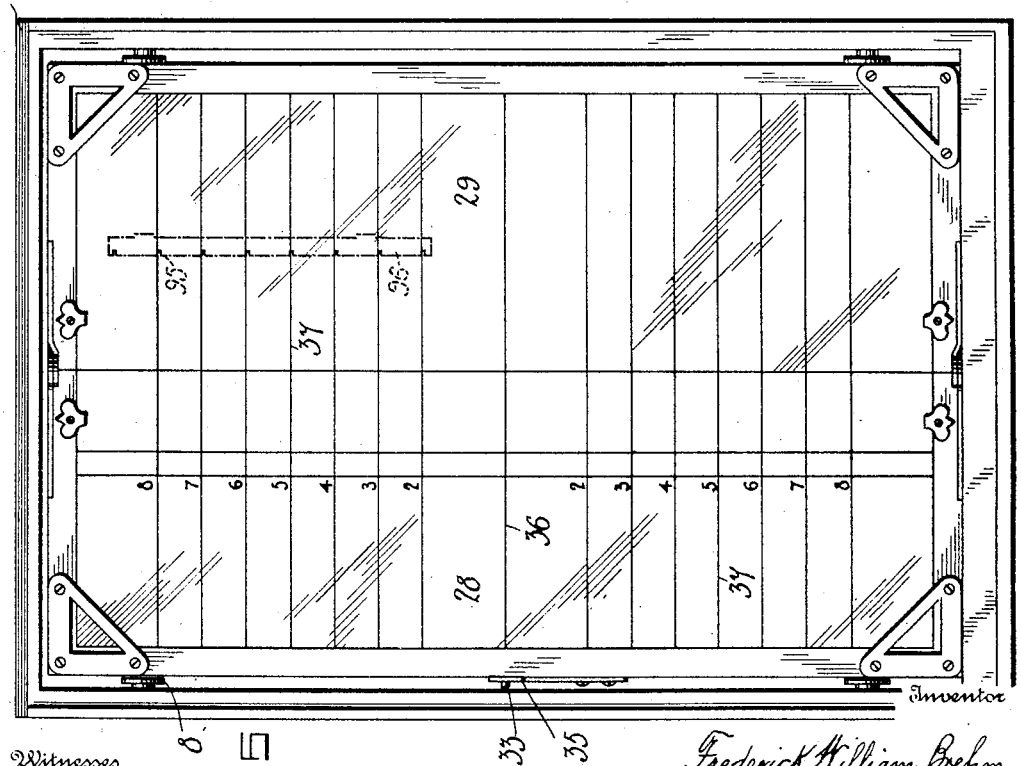
Witnesses
Inventor
Frederick William Brehm,
By Edwin Guthrie,
Attorney No. 780,406. PATENTED JAN. 17, 1905.
F. W. BREHM.
PANORAMIC CAMERA.
APPLICATION FILED OCT. 17, 1904.
6 SHEETS—SHEET 3.
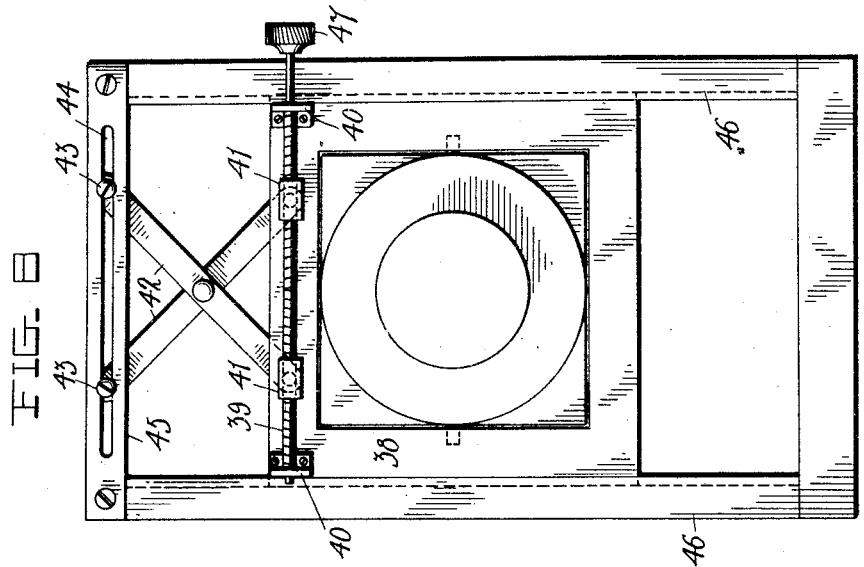
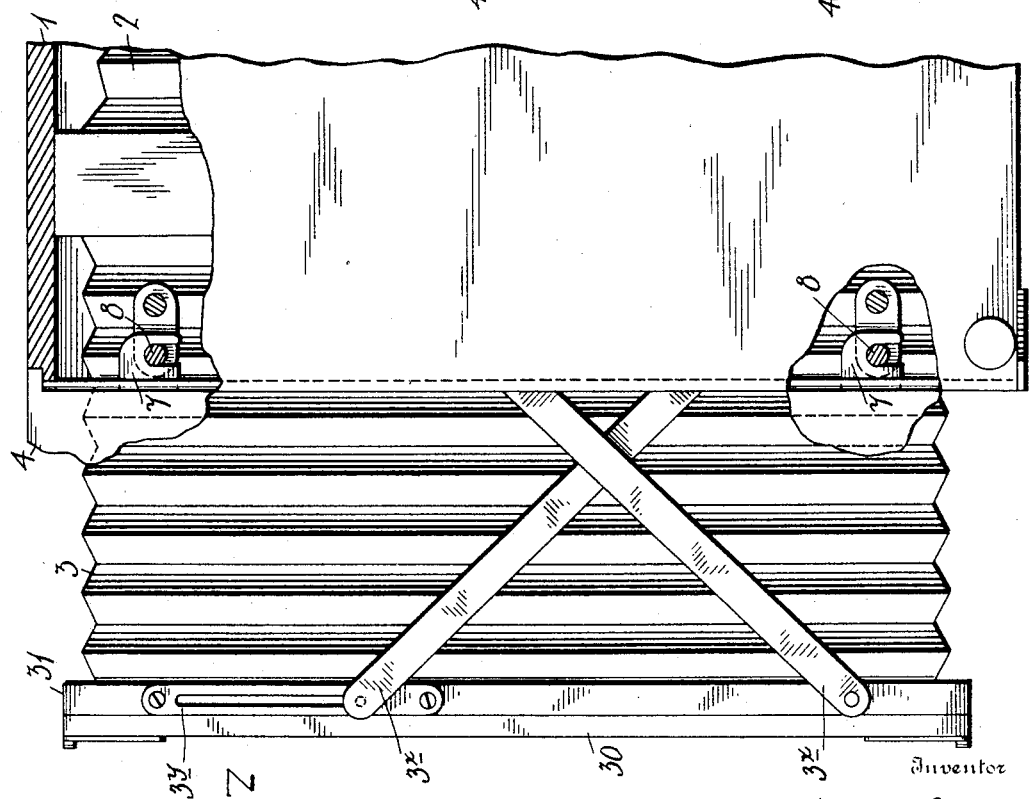
Witnesses
Inventor
Frederick William Brehm
By Edwin Guthrie
Attorney

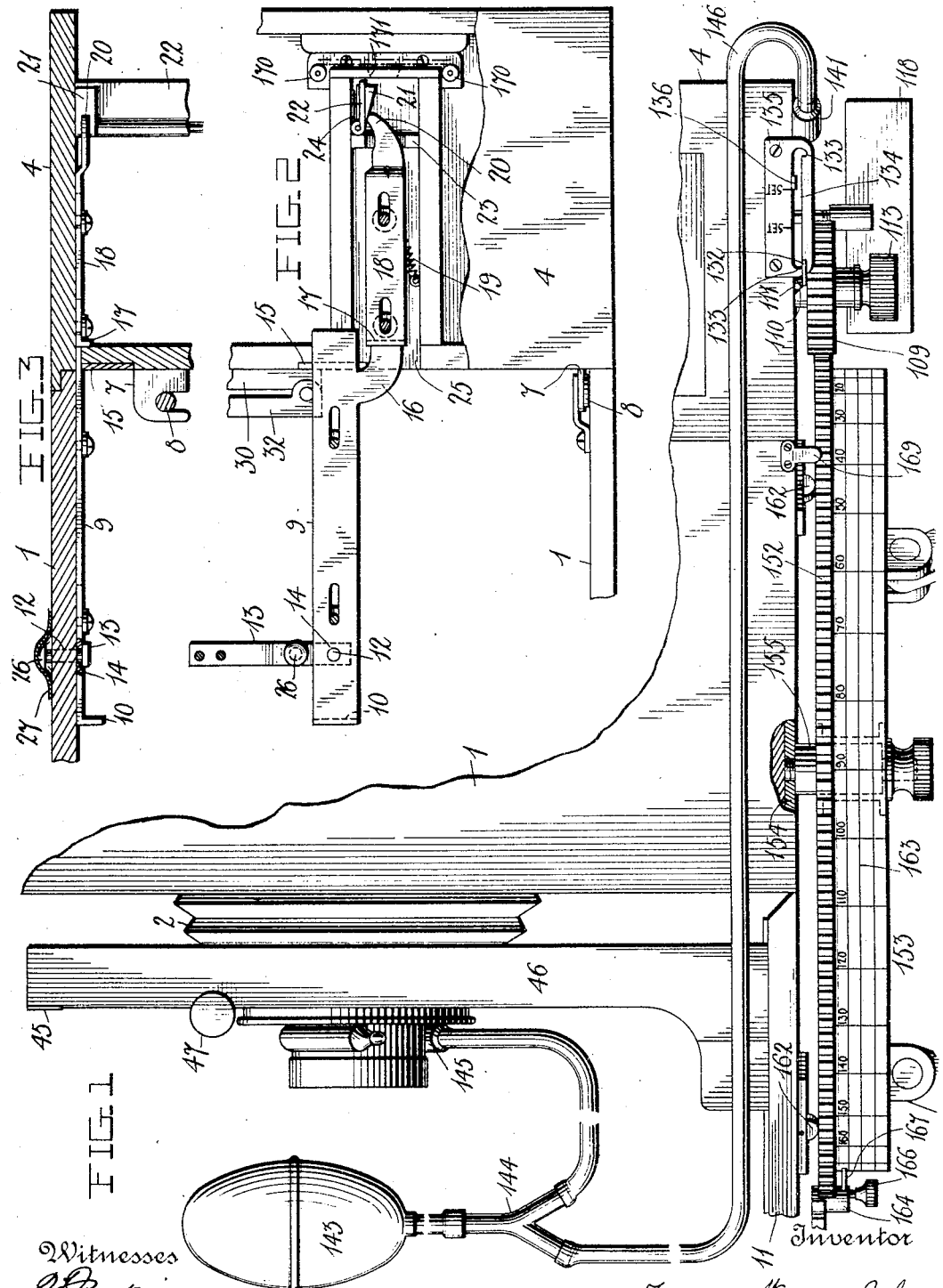

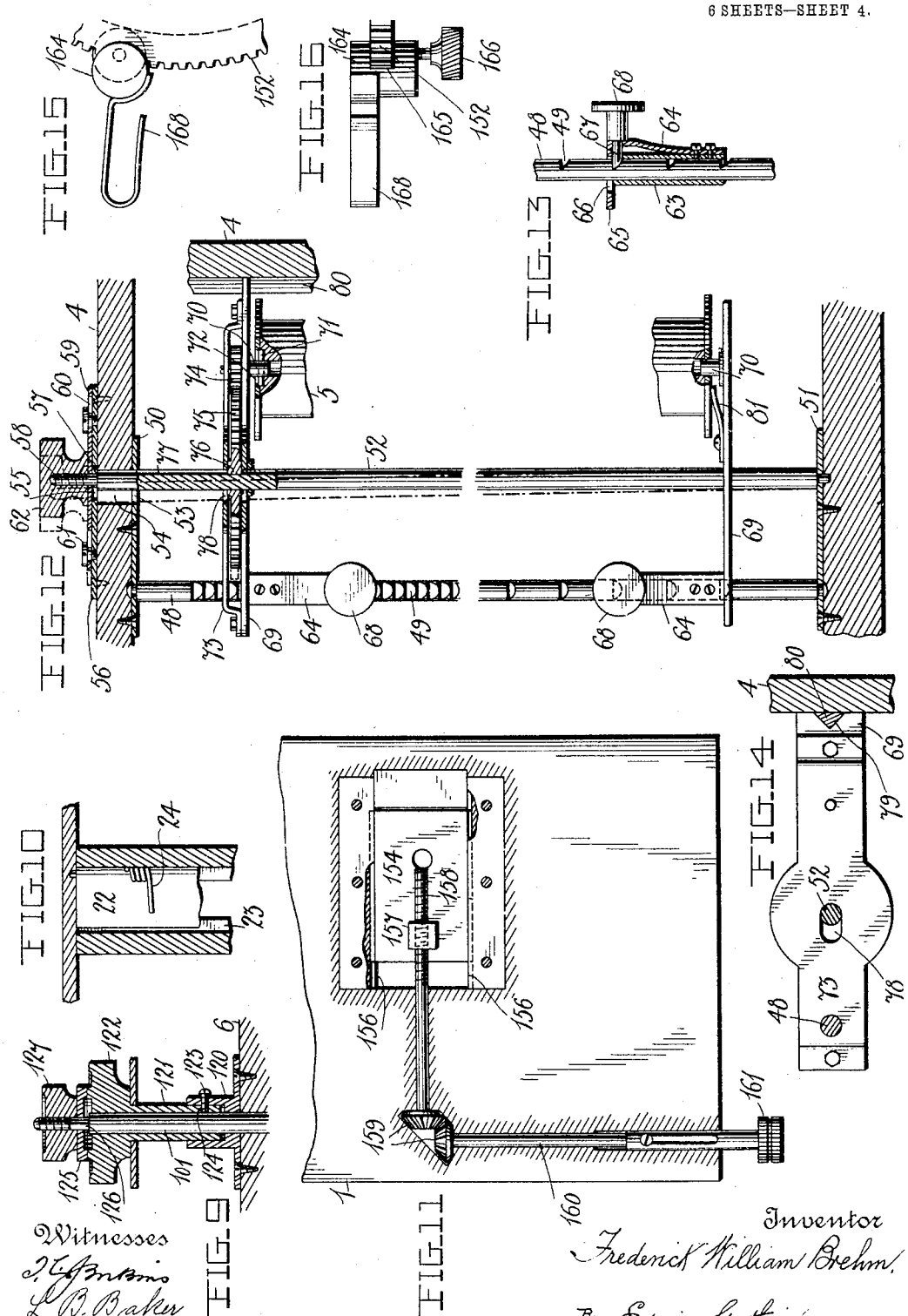

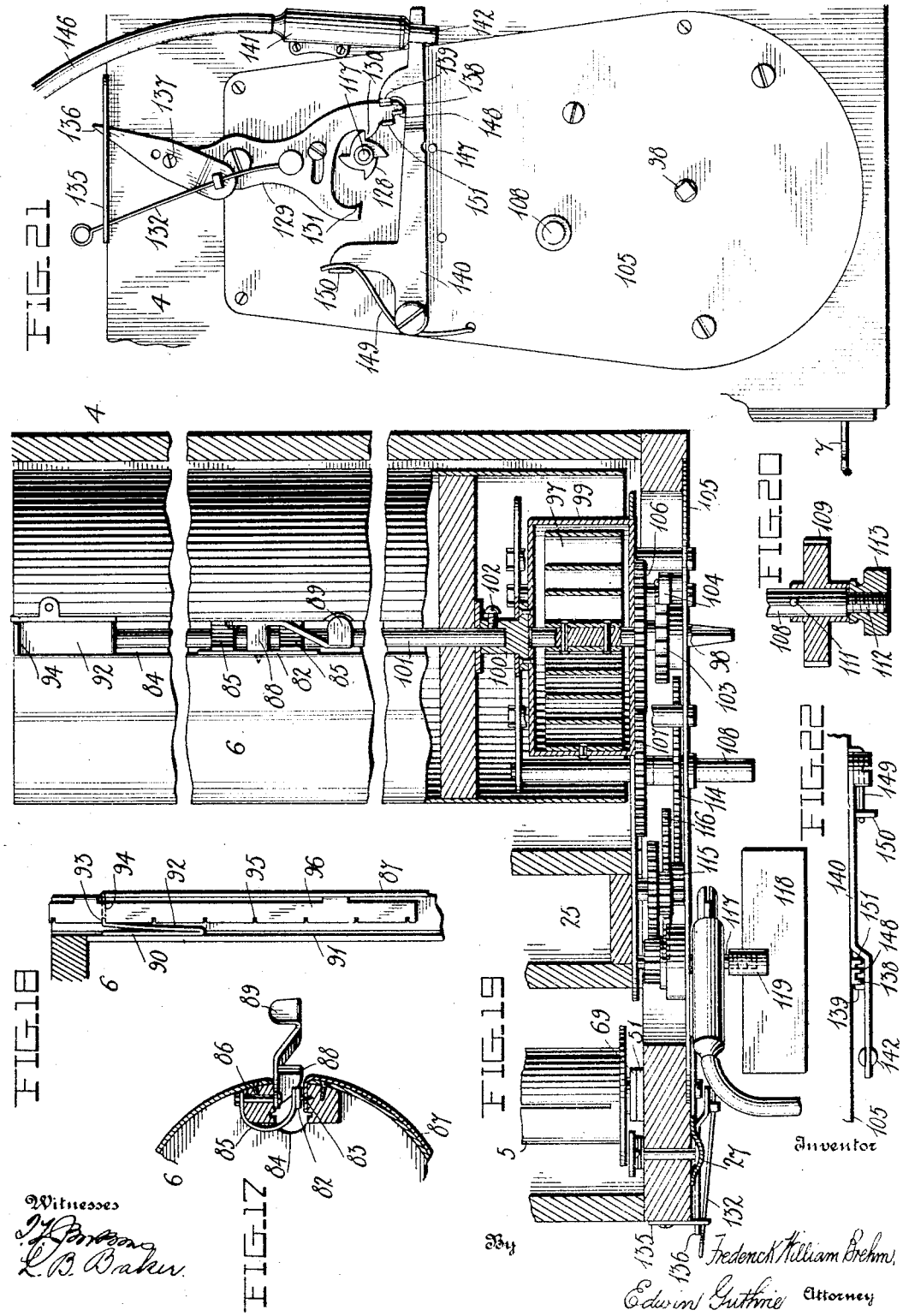

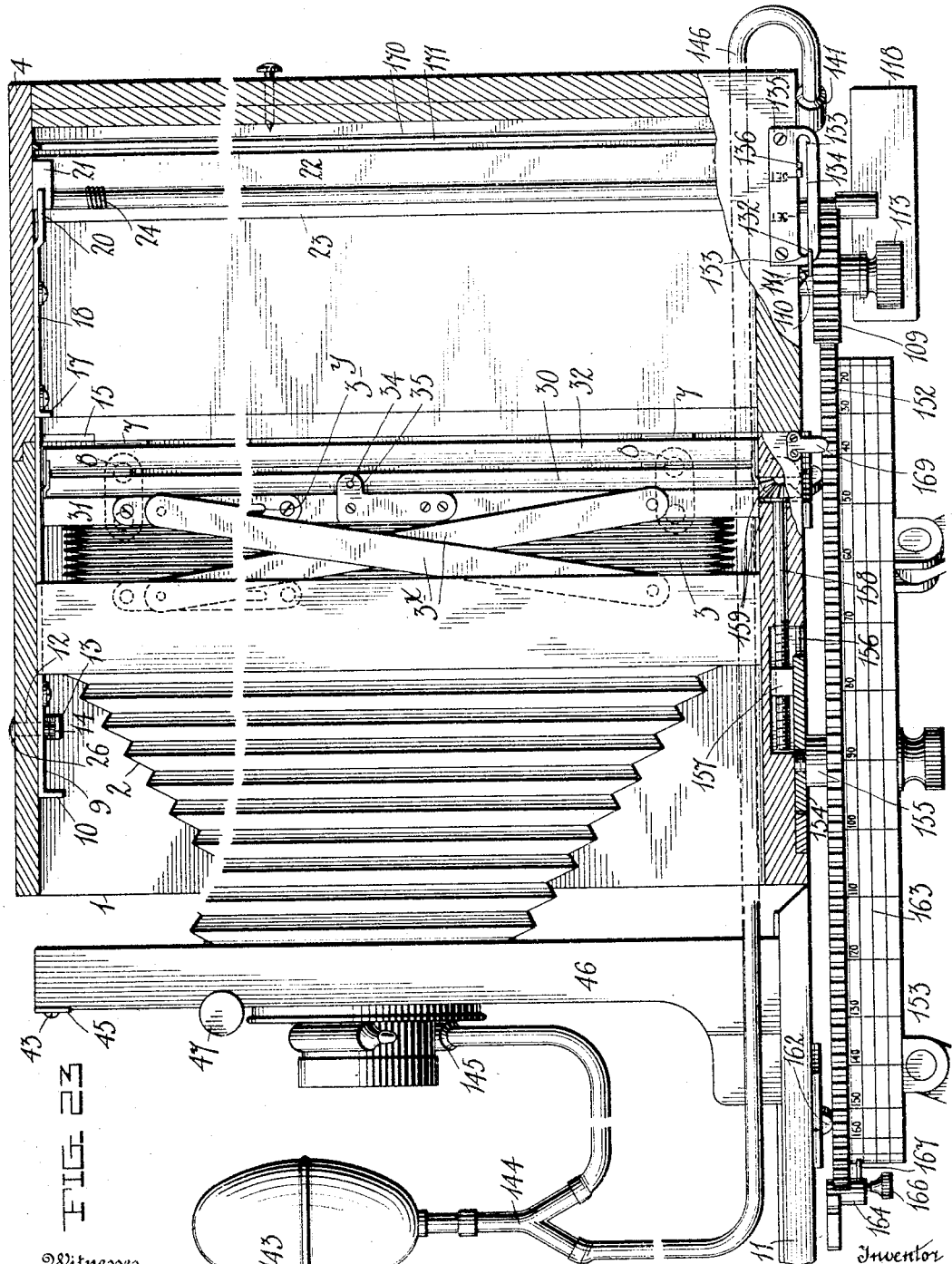

No. 780,406. Patented January 17, 1905.

UNITED STATES PATENT OFFICE.

FREDERICK WILLIAM BREHM, OF ROCHESTER, NEW YORK, ASSIGNOR TO ROCHESTER PANORAMIC CAMERA COMPANY, A CORPORATION OF WYOMING.

PANORAMIC CAMERA.

SPECIFICATION forming part of Letters Patent No. 780,406, dated January 17, 1905.

Application filed October 17, 1904. Serial No. 228,817.

*To all whom it may concern:*

Be it known that I, FREDERICK WILLIAM BREHM, a citizen of the United States, residing at Rochester, in the county of Monroe and State of New York, have invented certain new and useful Improvements in Panoramic Cameras, of which the following is a specification.

My invention relates to panoramic cameras; and its objects are to effect improvements in the construction and arrangement of devices for raising and lowering the lens; for moving the camera with respect to its center of revolution; for starting and stopping the revolving camera; for supporting, adjusting, and rotating the supply-roll; for supporting, locking, and rotating the feed-roll, including the particular form of motor employed; for locking the two camera-boxes together and for opening the door in the exposure-passage; for automatically closing that door before the boxes can be separated; for indicating the box movement in degrees during any revolution or given portion thereof and to provide an adjustable auxiliary cushion-stop for the revolving box; for securing the propelling-pinion upon its shaft; for clamping the film upon the feed-roll and for gaging its position vertically thereon, and to produce a folding ground-glass screen having indicating-marks whereby the image may be located with respect to the width of the film, and to fashion a removable film-box having an exposure-passage disposed with relation to the folding ground glass.

I accomplish the stated objects by forming and associating the necessary parts substantially as illustrated in the accompanying drawings, of which—

Figure 1 represents a side view of the exterior, all parts assembled, and shows the scale and indicator of the box movement in degrees for any picture. Fig. 2 represents a top view of the front or bellows box and the rear or film box together and the positions of the locking-bolt by which their separation is prevented, the folding ground glass, and exposure-passage in the film-box are indicated. Fig. 3 is a sectional view of part of the tops of the boxes and a side view of the locking-bolt and the exposure-door spring-bolt. Fig. 4 is a horizontal section through the film-box in an inverted and reversed position looking toward the top. Fig. 5 is a rear view of the folding ground-glass plate and frame opened, and Fig. 6 is a top view of the folding frame closed. Fig. 7 is a side view of the back part of the camera with the rear bellows extended and supporting the ground glass and frame. Fig. 8 is a front view showing the lens-raising devices. Fig. 9 is a vertical sectional view of the parts which lock the feed-roll on its axis. Fig. 10 is a fragmentary rear view of the door in the exposure-passage, showing its closing-spring. Fig. 11 is a plan view of the parts by which the center of revolution of the camera is changed. Fig. 12 is a detail view, partly sectional, showing the contrivances for supporting, adjusting, and rotating the supply-roll. Fig. 13 is a sectional side view of the sleeve and spring-catch carrying the adjustable supply-roll-supporting plates, and Fig. 14 is a top plan of the guide and groove elements for steadying those plates. Figs. 15 and 16 are respectively top and side views of the auxiliary spring-stop on the rack. Fig. 17 is a cross-section of a portion of the feed-roll, showing the film-clamp partly open. Fig. 18 is a vertical section of part of the feed-roll, showing the vertically-adjustable gage for the edge of the film. Fig. 19 is a vertical cross-section of the film-box, showing the supply and feed rolls, also the motor and its application to the feed-roll axis and speed-controller. Fig. 20 is a partly-sectional view showing the preferred method of securing the pinion on its shaft. Fig. 21 is a view of the stopping and starting devices from below, and Fig. 22 is an edge view of the pivoted latch-arm belonging to those devices. Fig. 23 is a vertical longitudinal sectional view of my invention, showing all parts assembled in operative form.

The same part is referred to by the same number throughout.

Numeral 1 marks the front box containing the lens-bellows 2 and the rearwardly-extensible bellows 3. The rear box 4, in which are placed the supply-roll 5 and feed-roll 6, with their actuating mechanism, is detachable from the front box, the camera-box as a whole comprising both boxes. (See Fig. 1.) To the rear box in suitable places are fixed the hook-plates 7, which engage buttons 8 upon the interior of the front box. (See Fig. 7.) It is discernible from Fig. 7 that in order to separate the two boxes the rear box must be raised to clear the plate-hooks from their buttons. Advantage is taken of this condition to lock the boxes together by the sliding bolt 9, (see Figs. 2 and 3,) having a finger-piece 10, by which it may be pushed rearwardly by reaching into the camera after its front 11 is turned down. As the bolt 9 is thus moved the lug 12 on spring 13 inside the camera snaps into the hole 14 in the bolt, which is thus held against forward return. Now it will be seen that the end of bolt 9 has passed above a plate 15, secured to the rear box, which box cannot, therefore, be raised until bolt 9 be returned forwardly. Bolt 9 has an offset 16, (see also Fig. 4,) which as the bolt is pressed rearwardly strikes the bent end 17 of a second sliding bolt 18, suitably secured to the inner surface of the top of the rear box, and that bolt also moves rearwardly. A spring 19, attached to bolt 18 and to the box 4, tends to draw the bolt forwardly and to impel bolt 9 in like direction. A nose or rounded end 20 of bolt 18 meets an inclined block 21, placed very near the top of a door 22, which is normally held closed against the vertically-slotted partition 23 by the coiled spring 24. (See Fig. 10;) but when bolt 18 has been pressed rearwardly the door is opened against its spring, as illustrated in Fig. 4. Both door and partition are shown to be located in exposure-passage 25 of box 4. Let it be assumed that push-button 26 under the covering 27 of the camera-box 1 be pressed. The lug 12 on spring 13 is freed from the hole in bolt 9, and the two bolts 9 and 18 under the influence of spring 19 are shot forward. Door 22 is then closed instantly by its own spring.

After removing the rear box the bellows 3 may be rearwardly extended. It bears the two equal portions 28 and 29 of the customary ground-glass plate, which I divide for reasons hereinafter stated. One portion is held in a half-frame 30, that is in fixed connection with the rectangular frame 31, to which bellows 3 is directly attached, and the remaining portion is held in a pivoted half-frame 32, that swings into position across the uncovered half of the rectangular space inclosed by the frame 31, where it is held releasable by the engagement of pin 33 with the orifice 34 in spring-catch 35 on frame 31, as shown in Figs. 5 and 6. The middle horizontal line 36 across the ground glass and the other lines 37 above and below it are for the purpose of locating the image with respect to the width of the film when the camera is focused in the usual way and will be again mentioned. When the bellows 3 is extended fully, the glass occupies the plane of the film. (See Fig. 7.)

Fig. 8 represents the preferred means for raising and lowering the lens, which avoids the use of a clamping device while firmly holding the lens in any position desired. Upon the movable frame 38, that carries the lens, a horizontal screw 39 is supported in bearings 40. The halves of the screw are oppositely threaded. The nuts 41 may therefore be caused to approach or recede from each other, the lower ends of cross-levers 42, which are pivoted to the nuts, being moved correspondingly. The levers are pivotally joined at their middle points, and their uppermost extremities are provided with screws 43, which pass through the longitudinal slot 44 in the horizontal top bar 45, that connects the standards 46. It is believed to be clear from the drawings that by turning screw 39 by thumb-screw 47 the movable frame and plate carrying the lens will be raised or lowered, as desired, and that the lens once so adjusted will not be moved from its position excepting by turning the screw. No clamping device is required, and the lens is always firmly held in its adjusted position.

Now considering Fig. 12, which illustrates the supply-roll supports and attachments, number 48 refers to a vertical rod provided with a series of notches 49 and held in position between plates 50 and 51, that are secured to the inner surfaces of top and bottom of the rear box. Parallel with rod 48 is a second rod 52, the lower end being rotatively held in lower plate 51, while its upper end passes through a slot 53 in plate 50 and through a like slot 54 in the top of the box and through a like slot 55 in an outside surface-plate 56. Then the rod has a shoulder 57, and the remainder of its end 58 is threaded and passes through a closely-fitting hole in the sliding plate 59, that lies and moves upon plate 56. Sliding plate 59 has slots 60 near its ends, and through those slots shouldered screws 61 pass into the plate 56. A thumb-nut 62 engages the end 58 of rod 52, and it is now apparent that the rod may be rotated as well as laterally vibrated by taking hold of the thumb-nut. The reason for the peculiar arrangement of the rod just described will now be explained. Movable up and down the notched rod are sleeves 63, having the springs 64, terminating in the horizontal portions 65, having slots 66, through which the rod 48 passes. On the springs 64, beneath their slotted terminal portions, are the lugs 67, formed to engage the notches of the rod. (See Fig. 13.) Outwardly the springs are provided with buttons 68, which when pulled upon draw the lugs 67 out of the notches and permit the adjustment of the sleeves up or down. To the end of each sleeve opposite that bearing the button and spring-lug there is suitably attached a plate 69. Those plates, of which there are two, one for each adjustable sleeve, constitute the supports for the supply-roll 5. Pintles 70, projecting toward each other, one on each plate 69 near their free ends, enter the axial bore of the roll. It is my practice to provide the pintle of the upper plate 69 with a transversely-projecting pin 71, which enters a recess 72 opening into the bore of the roll. It will be noted in Fig. 12 that the upper plate 69 has a strip of metal 73 secured to it at the ends and that the strip possesses a raised portion, which leaves an interval between it and the plate. In this interval and attached to the pintle 70 is a pinion 74. The pintle and pinion are revoluble by means of the gear 75, also occupying the mentioned interval between the strip and plate. The gear is rotated by the engagement of the feather 76, projecting inwardly, and the groove 77, running lengthwise along the rod 52, that passes centrally through the gear. Thus when the upper plate 69, and with it the gear and pinion, are raised or lowered the gear constantly engages the rod and may be rotated thereby. When the rod is exactly vertical, the gear meshes with the pinion, which may then be turned to revolve the supply-roll when it is desired to rewind an exposed film from feed-roll to supply-roll. During the unwinding of the supply-roll, however, the gear is freed from the pinion by moving rod 52 laterally, as explained, and in Fig. 14 it is shown that plates 69 have slots 78, through which rod 52 passes and in which it has some play sidewise. Fig. 14 further exhibits the V-shaped recess 79, formed in the outer ends of plates 69, and the triangular guide-bar 80, vertically secured to the back door of the film-box 4. The office of the guide is to steady plates 69 during the revolution of the supply-roll. To prevent the roll from revolving too rapidly, I introduce a spring 81, attached to the lower plate 69 and movable up and down with it. That spring presses against the end disk of the roll and prevents it from racing as film is drawn from it. The vertically-adjustable elements just described above enable a supply-roll of any chosen length to be rotatively supported and operated, as stated. Films of different widths may therefore be used in the same camera.

Now considering Fig. 17, number 82 marks the plate, and 83 the pin, of the feed-roll clamp. (See also Fig. 19.) The clamp is situated in a vertical opening 84, through the cylindrical wall of the roll midway between the ends of the roll. Plate 82 is borne by two flat springs 85, that are secured to one post 86 of the feed-roll frame at the side of the vertical opening. The pin 83 is forced through the end of the film 87, and its edge is clamped by the plate when the wedge-block 88 is forced back of the plate by downward pressure on the pivoted arm 89, to which the block is secured. As drawn in Fig. 17, if the arm 89 be pressed downwardly it is thought to be clear that the action of the wedge-block will force the pin through the film and the plate against it. The end edge of the film or the paper covering attached to the film is folded over the edge of the frame-post, as illustrated. The clamp being midway of the roll's length the width of the film is immaterial, and it may be secured with its edges equally distant from the ends of the roll.

To gage the location of the film, I provide the adjustable stop comprising, as shown in Fig. 18, a plate portion 90, arranged to slide up and down in grooves 91 in the vertical frame-posts 86 of the feed-roll, a spring portion 92, having an offset 93, and a flat end 94, bent at right angles with the spring portion and projecting through the vertical opening 84 in the feed-roll slightly beyond the surface of the roll. The offset 93 of the spring portion is adapted to engage the notches 95 of the vertically-disposed plate 96, secured to one of the frame-posts 86. By pressing inwardly upon the projecting end 94 the offset is disengaged and the stop may be raised or lowered to other notches. Attention is here called to the fact that the notches 95 are arranged upon a level with the upper lines 36 upon the ground-glass plate already described. For example, the gage as drawn in Figs. 18 and 19 shows the lower surface of the projecting end 94 in the same horizontal plane with line 8 at the top of the plate. (See Fig. 5.) If the film-gage be moved down two notches 95, the gaging projection 94 will correspond in position with number 6 of lines 36. If, therefore, a film clamped at the middle of its end edge has its upper side edge against the gage, it will occupy a space in width equaling that from line number 6 above the middle line on the ground glass to line number 6 below that line. Now should an image be located upon the unfolded glass plate in a suitable position with respect to those lines numbered 6 such image will be photographed in like position with reference to the width of the film employed.

In Fig. 19 it is shown that the inner end of the motor-spring 97 is attached to the centrally-disposed winding or key shaft 98, and the outer end of the spring is secured to the barrel or housing 99. Fixed centrally on top of barrel 99 is a socket 100, engaging and supporting the end of the feed-roll axis 101, which is removably held in the socket by a set-screw 102. Here it will be observed that key-shaft 98 and the feed-roll axis have their axes in vertical alinement, but that those parts are not connected excepting by way of the barrel and socket just described. The key-shaft is provided with a ratchet-wheel 103, and a suitable pawl 104 is pivoted to the base-plate 105, upon which the motor is erected. When the key-shaft is turned and the spring wound, it is clear that the barrel revolves correspondingly and rotates the feed-roll axis. It also rotates gear 106, secured beneath and to the barrel, and by means of a twin gear 107 turns the adjacent vertical shaft 108 at the same rate of rotation. Shaft 108 is the pinion-shaft. Upon it below the base-plate is secured the pinion 109. (See Figs. 1 and 20.) I prefer to attach the pinion by forming in its hub a diametric groove 110, arranged to engage a pin 111, transversely fixed through the key-shaft, and by threading the extremity 112 of the shaft and clamping the pinion in place by the thumb-nut 113. I do not limit myself, however, to these devices. Shaft 108 carries also the gear 114, that drives the pinions 115, and gears 116 of a train operating the fan-shaft 117 and fan 118. As ordinarily constructed by me the fan comprises a plate having a block 119, secured at the middle point of its upper edge and threaded to engage the correspondingly-threaded end of the fan-shaft.

As explained, the turning of the barrel by spring 97 turns the feed-roll axis, and when connected with the axis the roll turns similarly. I provide the devices shown in Fig. 9 to connect and disconnect the roll and its axis. Centrally upon the top of the roll is a socket 120. The axis 101 passes centrally through that socket, leaving an annular space for the reception of the sleeve 121 of bearing-head 122, in the axial bore of which the axis 101 fits and is revoluble. A set-screw 123 passes through the wall of socket 120 and enters a small hole 124 in the sleeve 121. Thus the head 122 is connected with the roll and turns with it. Now if the washer 125, having a central orifice formed to engage the squared portion 126 of the shouldered and threaded end of axis 101, be pressed downwardly by thumb-nut 127 upon the bearing-head 122 that head, and consequently the feed-roll, will be connected in a detachable manner with axis 101. Again, the turning of the barrel by the motor-spring sets the gear-train and fan in motion, unless those parts are restrained and prevented from rotating and the spring from running down until desired. The fan-shaft is locked, and as a result all the movable parts are held by the engagement of the ratchet-wheel 128 upon the fan-shaft immediately below the base-plate 105 with the duplex pivoted pawl-lever 129. (See Fig. 21.) The pawl-lever has two set positions, in one of which the tooth 130 as drawn engages the ratchet-wheel 128 and in the other the tooth 131 engages the ratchet. In Fig. 21 the pawl-operating spring 132 is under tension, and its force seeks to move tooth 130 to the right and free the ratchet. The outer end of spring 132 is in one catch-orifice 133 of the slot 134 through indicator-plate 135, (see also Fig. 1,) and the pivoted pointer 136 directs attention to one of the two words "Set" engraved in the plate. Here it will be observed that the pointer 136 inclines in a different direction from the spring 132 when the latter is under tension; but when the spring has thrown the pawl as far as it can in one direction—say to the left—engaging tooth 131 and ratchet-wheel 128, the outer end of the pawl-lever has carried the pivot 137 of the pointer toward the right, and it points through the slot 134, between the words "Set," as indicated by the broken lines. Thus the operator is informed that the force of spring 132 has been expended and it must be again set—that is to say, its outer end must be detached from the left-hand catch-orifice 133 of the indicator-plate and moved along the slot into the right-hand catch-orifie. Such a movement of the end of spring 132 will swing the pointer upon its pivot, giving it again an inclination from the spring and causing it to point to the left-hand word "Set" upon the indicator-plate.

In Fig. 21 tooth 130 of the pawl-lever is kept locked with the ratchet by the contact of the lug 138 of the pawl and the lug 139 of pivoted arm 140, the arm being further illustrated in Fig. 22. To move the arm and disengage the lugs, I employ the pneumatic cylinder 141, having its plunger 142 bearing against the arm. Pressure upon the bulb 143 delivers air by way of Y 144 (see Fig. 1) to the lens-operating cylinder 145 and through tube 146 to the cylinder 141, pushing its plunger and the end of arm 140 outwardly until the arm meets and is halted by the pin-stop 147, projecting downwardly from the base-plate. At this stage of the operation lug 139 of the arm has left the path of lug 138 of the pawl-lever, but is directly in the way of lug 148 of the pawl-lever, which is thus brought to rest. The stoppage is only temporary, as the plunger must be returned into its cylinder 141 to be ready for another outward effort. Such return is accomplished by the spring 149 acting upon the projecting wing 150 of the arm, whereby the arm is given a reverse movement to its original position, returning the plunger into its cylinder. During this reverse movement of arm 140 its lug 139 leaves lug 148 of the pawl-lever and intercepts lug 151 of the pawl, again stopping its progress toward the right. Now as tooth 130 no longer engages the ratchet-wheel on the fan-shaft that shaft with the connected gearing, the pinion and pinion-shaft 108, and the motor-spring barrel all revolve under the influence of the uncoiling motor-spring. Pinion 109 is the driving-pinion and engages the circular geared rack 152, usually employed in panoramic cameras and secured upon the top 153 of the tripod, (see Fig. 1,) thereby revolving the camera-box. When the box has swung through the desired arc of the circle, it is brought to rest by again pressing bulb 143, the action being to project the plunger and move arm 140 to the pin-stop, removing lug 139 from its contact with lug 151 and permitting the pawl-lever under the influence of its spring 132 to reach the farthest point toward the right and bringing tooth 131 of the pawl into engagement with ratchet-wheel, whereby all moving parts are halted. Spring 132 being set anew in the right-hand catch-orifice of the indicator-plate, as already explained, another like operation of the camera-box may be made, the movements of the pawl-lever being merely reversed, but in no sense different in character from those described.

As is well understood in these panoramic cameras, the rate of exposure of the film bears a certain relation to the focal length of the lens employed. Under certain conditions it is necessary to change the lens and to move the film within the box correspondingly. I accomplish this by attaching another pinion of different diameter upon the pinion-shaft. To accommodate a pinion, for example, of greater diameter than pinion 109 illustrated, the pinion-shaft must be moved slightly farther away from rack 152. To effect the bodily movement of the box, the plate 154, into which the arbor 155 is screwed, (see Fig. 1,) is placed between guides 156 in the bottom of the front box 1, and a nut 157 is attached to the plate. (See Fig. 11.) Through the nut passes the adjusting-screw 158, and the screw is rotated by the miter-gears 159 and rod 160, the rod leading to the side of the box and having the thumb-piece 161. It is thought to be clear that, nut 157 and the plate being stationary, upon turning the screw the box may be moved either way and a pinion of requisite diameter admitted.

The rollers 162 upon the front and bottom of box 1 are introduced to lessen the friction of the revolving camera-box. Those rollers travel upon the flat top of the tripod. (See Fig. 1.)

It is occasionally desirable to know the number of degrees in the portion of the circle through which the camera-box swings and to stop the box at the end of a given number of degrees. I attach about the edge of the circular top of the tripod a strip of suitable material, metal or otherwise, having a scale 163 printed or engraved thereon setting forth the degrees of the circle and usually, though not essentially, the length of film exposed when the camera has moved through any decimal number of degrees. The lengths of film are given for three different lenses having different focal lengths and calling for different pinions, as previously explained. To stop the box at the end of the number of degrees swing predetermined, I employ the stud 164, having a recess 165 cut in one side of it, which admits the edge of the rack 152. A thumb-screw 166, entering the stud from below, then clamps it upon the rack, and an indicating-finger 167 points to the number of degrees at which the stop is set. A spring-arm 168 encounters the side or suitably-arranged projection 169 on the camera-box and brings the box to rest at the required point without excessive jar. (See Figs. 15 and 16.)

In operation after the supply-roll has been placed in position between the pintles 70 in its proper compartment at the side of the exposure-passage the rod 52 is tilted to disengage the pinion 74 and gear 75, and the feed-roll 6 is secured to its axis 101 by setting up the thumb-nut 127. The end of the film is passed over the vertical rollers 170 and across the exposure-slot 171 and attached to the feed-roll by the feed-roll clamp, the location of the film being arranged by the end 94 of the adjustable gage-stop. The two boxes are now unlocked from each other by pressing the button 26. The door 22 in the exposure-passage is automatically closed and all light excluded before any movement toward separating the boxes can be made. After the image is located upon the ground glass the glass is folded as described to clear the exposure-passage 25, which, it will be noted, is at one side of the middle vertical line of the face of box 4, and the boxes are placed together and locked by pushing rearwardly the bolts 9 and 18. The boxes cannot be locked until they are placed actually together, and then the movement of the locking-bolts opens door 22, when all danger from entering light is prevented.

After all the film has been exposed and accumulated upon the feed-roll the pinion 74 and gear 75 are again engaged, and by turning rod 52 the film may be quickly rewound upon the supply-roll to be removed from the box by way of the side door 172. (See Fig. 4.)

Having thus described my invention and the mode of operation of the various parts thereof, what I claim is—

1. In a camera, a ground-glass plate divided into portions pivotally connected with each other and adapted to fold one portion upon another.

2. In a camera, the combination with a frame divided into portions pivotally connected with each other and adapted to fold one portion upon another, of ground-glass plates secured in the portions of said folding frame.

3. In a camera having a removable film-box the combination with a rearwardly-extensible bellows, of a frame adapted to be folded, and ground-glass plates secured in the said frame.

4. In a camera having a removable film-box, the combination with a front or bellows box, of a ground-glass plate comprising pivotally-connected portions adapted to fold one portion upon another.

5. In a panoramic camera having a removable film-box, the combination with a revoluble front or bellows box, of a ground-glass plate comprising pivotally-connected portions adapted to fold one portion upon another.

6. In a panoramic camera having a removable film-box, the combination with a revoluble front or bellows box, of a frame divided into portions pivotally connected with each other and adapted to fold one portion upon another, and ground-glass plates secured in the portions of said folding frame.

7. In a camera having a removable film-box, the combination with a pivoted ground-glass plate, of a bellows attached to said plate and having a limited extension whereby said plate is located in the plane of the exposed film.

8. In a camera having a removable film-box, the combination with a ground-glass plate having pivotally-connected portions adapted to fold one portion upon another, of a bellows attached to said plate and having extension-limiting devices whereby the plate is located in the plane of the exposed film.

9. In a camera having a removable film-box, the combination with a frame having pivotally-connected portions adapted to fold one portion upon another, of ground-glass plates secured in the portions of said frame, and a bellows attached to said frame and having extension-limiting devices whereby said plate is located in the plane of the exposed film.

10. In a camera, the combination with a removable film-box having an exposure-opening, of a ground-glass plate comprising pivotally-connected portions adapted to fold one portion upon another whereby the portion of said plate is removed from before said opening.

11. In a camera, the combination with the lens, of an exposure-chamber provided with an exposure-opening arranged at one side of the optical axis of the lens.

12. In a camera, the combination with the lens, of a film-box provided with an exposure-opening located at one side of the optical axis of said lens.

13. In a camera, the combination with the lens, of a removable film-box provided with an exposure-opening located at one side of the optical axis of said lens.

14. In a camera, the combination with the lens, of a removable film-box provided with an exposure-opening located at one side of the optical axis of said lens, a ground-glass plate comprising pivotally-connected portions adapted to fold one portion upon another whereby the portion of said plate is removed from before said exposure-opening.

15. In a camera, the combination with a removable film-box provided with an exposure-passage and an exposure-opening in rear of said passage, a pivoted ground-glass plate, a bellows attached to said plate whereby it may be adjusted in the plane of the exposed film.

16. In a panoramic camera, the combination of a removable film-box provided with an exposure-passage and an exposure-slot at the rear of said passage, a ground-glass plate comprising portions pivotally connected and adapted to fold one portion upon another, and a bellows attached to said plate whereby the plate may be adjusted in the plane of the exposed film.

17. In a camera, the combination with a removable film-box, of a ground-glass plate comprising portions pivotally connected with each other and adapted to fold one portion upon another, one of said plate portions being secured transversely with respect to the camera, and said film-box having an exposure-opening disposed relatively beyond the edge of said transverse plate portion.

18. In a camera, the combination with a removable film-box provided with an exposure-passage, a door in said exposure-passage, a spring acting against the door to hold it yieldingly and normally closed, and devices whereby said door may be opened and secured.

19. In a camera, the combination with a front or bellows box, of a removable film-box provided with an exposure-passage, a door in said exposure-passage, devices borne by said boxes whereby said door may be operated.

20. In a camera, the combination with a front or bellows box, of a removable film-box, coupling connections whereby said boxes are held together, and a locking device constructed and arranged to lock said boxes one to the other by opposing the uncoupling of said connections.

21. In a camera, the combination with a front or bellows box, of a removable film-box, hook-plates and buttons secured to said boxes for coupling them together whereby one box must be raised with respect to the other to engage and free said plate-hooks and buttons, and a locking device arranged to lock said boxes against said raising movement.

22. In a camera, the combination with a front or bellows box, of a removable film-box, coupling connections whereby said boxes are held together, said connections constructed to be engaged by a sliding movement of the boxes one upon the other, and a locking device arranged to secure said boxes against such sliding movement.

23. In a camera, the combination of a front or bellows box, of a removable film-box, coupling connections constructed to hold said boxes one to the other, and locking means constructed and arranged to hold said boxes and connections together.

24. In a camera, the combination with a front or bellows box, of a removable film-box provided with an exposure-passage, a door in said exposure-passage, a spring arranged to hold the door yieldingly and normally closed, a door-opening device, and locking means whereby said boxes are held together and the said door-opening device actuated.

25. In a camera, the combination with a front or bellows box, of a removable film-box provided with an exposure-passage, a door in said exposure-passage, a spring arranged to hold the door yieldingly and normally closed, a door-opening device borne by the said film-box, and locking means borne by the said front box whereby said boxes are held together and the said door-opening device actuated.

26. In a camera, the combination with a front or bellows box, of a removable film-box provided with an exposure-passage, a door in said exposure-passage, door-opening and door-closing devices, box-coupling connections constructed to be engaged by moving said boxes with relation to each other and contiguously, and locking means whereby the boxes are held together and their relative movement opposed, the said locking means being also adapted for actuating said door-opening device.

27. In a camera, the combination of a front or bellows box, of a film-box provided with an exposure-passage, a door in said passage held yieldingly and normally closed, a sliding bolt adapted to open the door, a spring arranged to withdraw said bolt and allow said door to close, a second sliding bolt arranged to move the said door-opening bolt and to be moved by it, and a catch adapted to engage the said second bolt whereby the door is held open.

28. In a camera, the combination with a feed-roll, of a bearing-head having a sleeve removably and centrally secured to the top of the feed-roll, an axis having a threaded end and passing movably through said feed-roll and bearing-head and its said sleeve, a washer, and a thumb-nut engaging the threads of the axis whereby the washer is clamped upon the bearing-head and the feed-roll secured upon the axis.

29. In a camera, the combination with a pinion-shaft having a threaded extremity and a diametrically-projecting pin, a pinion having its hub provided with a transverse groove arranged to engage the said pin, and a thumb-nut whereby the pinion is clamped upon the shaft.

30. In a camera, the combination with horizontal supply-roll-supporting plates having pintles adapted to engage the roll, of means for adjusting the said plates up and down, a pinion secured to and adapted to revolve one of said pintles, a gear engaging the said pinion, and means for revolving the said gear and having a constant engagement with said gear in any position of the plate.

31. In a camera, the combination with a vertically-disposed notched standard, of horizontal supply-roll-supporting plates, devices for adjusting the plates up and down on the standard, the said plates having pintles adapted to engage the supply-roll, a pinion secured to and adapted to revolve one of said pintles, a gear engaging the said pinion and movable with the plate bearing the pinion, a revoluble rod in constant engagement with the said gear in any position of the plate, the said rod passing through the plates and the top of the camera and having a tilting movement whereby the said gear is caused to engage or leave the pinion.

32. In a camera, the combination with vertically-adjustable roll-supports, of separable roll-rotating devices connected with the said supports and extending outside the camera, the said roll-rotating devices constructed and arranged to be brought into engagement at any position of said supports.

33. In a camera, the combination with vertically-adjustable roll-supports, of roll-rotating devices connected with said supports and extending outside the camera, said roll-rotating devices being constructed to rotate the roll in any position of the said supports.

34. In a panoramic camera, the combination with a tripod-top, of a center pin vertically disposed and revoluble in the said top, the said pin constituting the center of revolution of the camera, adjusting devices adapted to engage the pin whereby the camera may be moved with respect to the pin.

35. In a camera, the combination with a movable vertically-guided lens-carrying frame, of a slotted top bar, a transverse screw having portions oppositely threaded, nuts engaging the screw, and pivotally-connected cross-levers pivotally connected to the said nuts and provided with attachments engaging the slot in the said bar, whereby the said frame is raised or lowered.

36. In a panoramic camera, the combination with a feed-roll axis, of a key-shaft in line with said axis, a motor-spring attached to the key-shaft and arranged to be wound up by said shaft, a revoluble barrel secured to the motor-spring and arranged to be revolved by the spring, the said feed-roll axis and barrel being directly connected, a pinion-shaft, and gearing between the barrel and pinion-shaft whereby said shaft is turned in the same time with said axis.

37. In a panoramic camera, the combination with a hollow feed-roll, of an axis and means securing the roll on the axis, a key-shaft in line with said axis, a motor-spring disposed within the feed-roll and attached to the said key-shaft and arranged to be wound up thereby, one end of said spring being connected with the feed-roll axis, a pinion-shaft, and gearing whereby said pinion-shaft is actuated by the said spring.

38. In a panoramic camera, the combination with a hollow feed-roll, of a key-shaft axially alined with said feed-roll, a revoluble barrel disposed within the feed-roll, devices connecting said barrel and feed-roll, a motor-spring having one end connected with the said barrel and the remaining end attached to the said key-shaft by which the spring is wound up, a pinion-shaft, and gearing arranged between the barrel and pinion-shaft whereby the shaft is turned in the same time with the feed-roll.

39. In a panoramic camera, the combination with a feed-roll, of a key-shaft axially alined with said feed-roll, a revoluble barrel, devices connecting said barrel and feed-roll, a motor-spring having one end connected with the said barrel and the remaining end attached to said key-shaft by which the spring is wound up, speed-controlling mechanism, a pinion-shaft, and gearing arranged between the barrel and pinion-shaft whereby the shaft is turned in the same time with the said feed-roll.

40. In a panoramic camera, the combination with a feed-roll, of a key-shaft axially alined with the said feed-roll, a motor-spring having one end connected to the key-shaft by which the spring is wound up, devices connecting the remaining end of the said spring and the said feed-roll, a pinion-shaft, and gearing whereby the said pinion-shaft is revolved.

41. In a camera, the combination with a film-box having an exposure-passage, of a door in said passage, a spring arranged to hold the door normally closed, a door-opening device, and a spring arranged to draw said door-opening device from the door permitting the door to close.

42. In a camera, the combination with a vertically-guided lens-carrying frame, of pivotally-connected cross-levers, a screw, attachments pivotally connected to two extremities of the said cross-levers and engaging the said screw, and guiding means engaging the remaining extremities of the cross-levers, the whole arranged to raise and lower said frame.

43. In a panoramic camera, the combination with a revoluble shaft, of a ratchet-wheel on said shaft, a pivoted pawl-lever having a tooth engaging the said ratchet-wheel, catch devices fixed at separated points, a spring arranged to be brought into engagement with said catch devices alternately and adapted to move the end of said pawl-lever back and forth into and out of engagement with said ratchet-wheel, and a pivoted arm-latch engaging the said pawl-lever.

44. In a panoramic camera, the combination with a revoluble shaft, of a ratchet-wheel on said shaft, a pivoted pawl-lever having teeth at separated points disposed to alternately engage the ratchet-wheel, catches fixed at separated points, a spring adapted to engage the said catches alternately and to move the toothed end of the pawl-lever back and forth, a pivoted arm-latch capable of limited vibratory movement, the said pawl-lever and arm having engaging lugs whereby vibrations of the arm cause the said pawl-lever to move step by step in either direction under the force of said spring.

45. In a panoramic camera, the combination with a revoluble shaft, of a ratchet-wheel on said shaft, a pivoted pawl-lever having teeth at separated points, disposed to alternately engage the ratchet-wheel, catches fixed at separated points, a spring adapted to engage the said catches alternately and to move the toothed end of the pawl-lever back and forth, a pivoted arm-latch capable of a limited vibratory movement, the said pawl-lever and the said arm-latch having engaging lugs whereby one vibration of the said arm-latch releases one of said teeth, and a succeeding vibration of the arm-latch effects the engagement of the remaining tooth and the said ratchet-wheel.

46. In a panoramic camera, the combination with a revoluble shaft, of a ratchet-wheel on said shaft, a pivoted pawl-lever having teeth at separated points alternately engaging the said ratchet-wheel, a plate having catch devices at separated points and indicating-marks, a spring adapted to engage the catch devices alternately and to move the toothed end of the pawl-lever back and forth, a pointer pivotally carried by the said pawl-lever and engaging the spring whereby the bending of the spring to engage the catch devices moves the end of the pointer to one of said indicating-marks.

47. In a panoramic camera, the combination with a revoluble shaft, of a ratchet-wheel on said shaft, a pivoted pawl-lever having two points of engagement with the said ratchet-wheel, a spring arranged to act upon the pawl-lever, means for securing the free end of the spring at separated points alternately whereby the pawl-lever is moved back and forth, an arm-latch controlling the movements of the said pawl-lever, and devices for operating the arm-latch including a pneumatic bulb, cylinder and plunger.

48. In a camera, the combination with a feed-roll having a longitudinal opening through its cylindrical surface, of an adjustable film-stop placed in said opening and having a portion projecting outwardly beyond the said surface whereby the film may be positioned with respect to the length of the said feed-roll, and clamping means constructed to secure a film to the said feed-roll.

49. In a camera having a removable film-box, the combination with a feed-roll having a longitudinal opening through its cylindrical surface, of an adjustable film-stop arranged in said opening and having a spring-catch and a portion projecting outwardly beyond the said surface whereby the film may be positioned with respect to the length of the said feed-roll, a plate having notches at intervals arranged to engage the said spring-catch, and a ground-glass plate provided with lines in the same horizontal plane with said notches whereby the position of the image upon the glass indicates the position of the picture upon the film.

50. In a camera, the combination with a feed-roll, of a film-stop adjustable with respect to the length of the feed-roll and having a projecting portion.

51. In a camera having a movable film-box, the combination with a feed-roll, of a film-stop adjustable with respect to the length of the feed-roll and having a projecting portion, means for locating the said film-stop at predetermined points, and a ground-glass plate provided with lines in the same horizontal plane with the said points whereby the position of the image upon the glass indicates the position of the picture upon the film.

52. In a panoramic camera, the combination with a tripod-top, of a scale applied to the said top indicating the degrees of a circle, a finger secured to the camera, an adjustable stop adapted to be secured upon the tripod at any division of the scale, the said stop being arranged in the path of the said finger whereby the camera is stopped at a predetermined degree.

53. In a panoramic camera, the combination with a tripod-top consisting of a circular disk, a scale applied to the circumference of the said disk and indicating the degrees of a circle, a finger secured to the camera, an adjustable stop secured upon the tripod at any division of the scale, the said stop being arranged in the path of the said finger whereby the camera is stopped at a predetermined degree.

In testimony whereof I affix my signature in presence of two witnesses.

FREDERICK WILLIAM BREHM.

Witnesses:
 DAVID A. REAVILL,
 GEO. D. REED.